I. HILL.
RESILIENT FRUIT CRATE.
APPLICATION FILED JAN. 23, 1913.
1,074,323.
Patented Sept. 30, 1913.
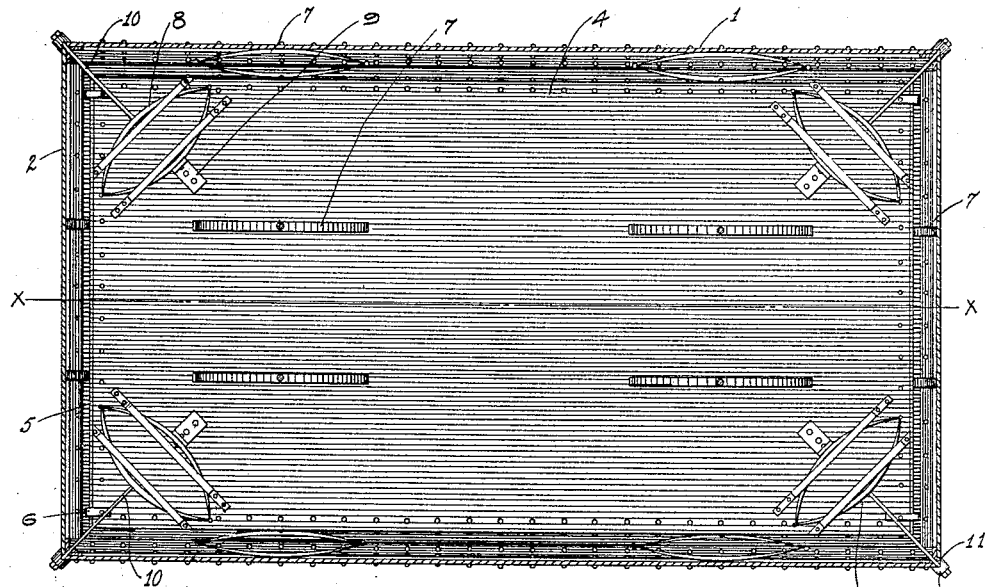
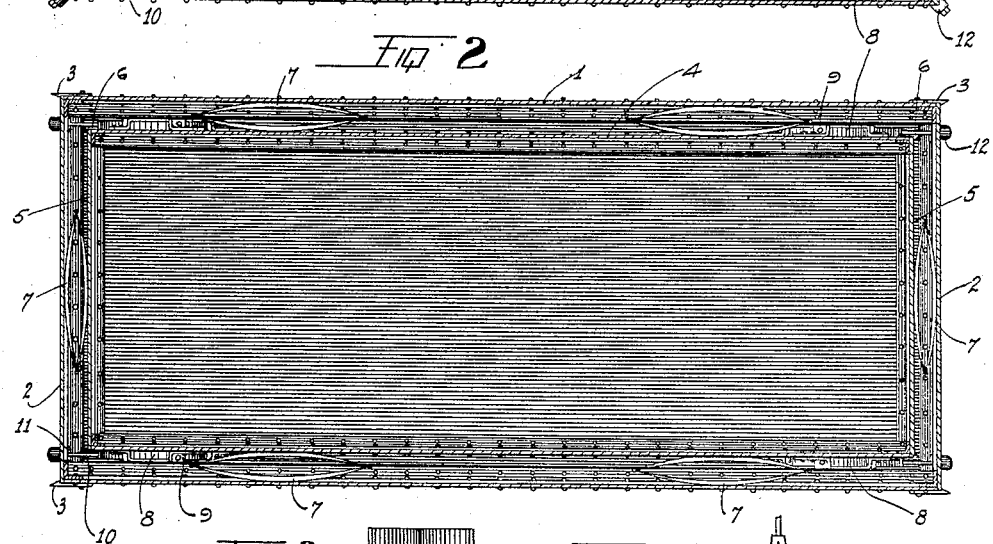
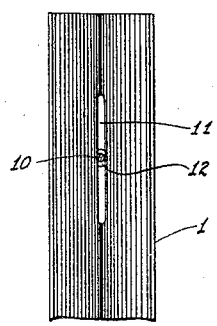
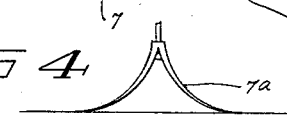
Witnesses
Clarence M. Smith
J. B. Webster
Inventor
Irving Hill
Samuel D. Webster
Attorney

UNITED STATES PATENT OFFICE.

IRVING HILL, OF WALLACE, CALIFORNIA.

RESILIENT FRUIT-CRATE.

1,074,323.  Specification of Letters Patent.  Patented Sept. 30, 1913.

Application filed January 23, 1913. Serial No. 743,791.

*To all whom it may concern:*

Be it known that I, IRVING HILL, a citizen of the United States, residing at Wallace, in the county of Calaveras, State of California, have invented certain new and useful Improvements in Resilient Fruit - Crates; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in crates used for shipping fruits of all kinds, the object of the invention being to produce a shipping crate for receiving the boxes or baskets of fruit, which crate will be resiliently supported on its top, bottom, sides and ends in order that the jolts and jars encountered by the same in transportation may be entirely compensated for and not be such as will cause the fruit to mash, bruise and spoil.

A further object of the invention is to produce a simple and inexpensive device, and yet one which will be exceedingly effective for the purposes for which it is designed.

These objects, I accomplish by means of such structure and relative arrangement of the parts as will fully appear by a perusal of the following specification and claim.

On the drawings similar characters of reference indicate corresponding parts in the several views.

Figure 1 is a plan view in section of the entire device showing the top of the outer crate member removed. Fig. 2 is a sectional view of the complete crate taken on a line X—X of Fig. 1. Fig. 3 is a detached fragmentary view of one corner of the outer crate. Fig. 4 is a fragmentary view of a modified form of spring from that shown in the other views.

Referring now more particularly to the characters of reference on the drawings, the numeral 1 designates the outer crate provided with a door 2 at one end held in position by suitable clips 3.

The numeral 4 designates the inner crate spaced from the crate 1 at the top, bottom, sides and ends and provided with a door 5 adapted to register with the door 2 and held in position by spring clips 6. Interposed between the crate 1 and the crate 4 at the top, bottom, sides and ends are suitable springs 7 of any desired construction. Disposed transversely across the corners of the crate 4 at the top and bottom are springs 8 being secured on one side as at 9 to the crate 4 and on the other side having rods 10 projecting through slots 11 in the corners of the crate 1, such rods being provided with retaining nuts 12 on their outer ends. As will be noted, the boxes or baskets of fruit may be inserted through the doors 2 and 5 into the inner crate 4 and the springs 7 give a necessary resiliency to the top, bottom, sides and ends of said crate 4 to relieve the fruit from jolts or jars. Should the inner crate 4 attempt to swing or rotate in a circumferential manner as it would be inclined to do, when being carried in railway cars which are continuously jolting and jarring and swinging from side to side, the springs 8 compensate for and overcome this tendency, thus holding the fruit against any form of jolt or jar which might be encountered.

Fig. 4 shows a modified form of spring 7ª which might be used in place of the spring 7, as shown.

From the foregoing description it will be readily seen that I have produced such a device as substantially fulfils the objects of the invention as set forth herein.

In addition to the structure above described, I might make specially built crates just adapted to fit into railway cars and in that event, instead of end doors I would provide side doors which would be of a size and shape to conform to the side doors of the car. Also instead of the spring structure shown in the drawings, I would be able to use rubber springs. Further the crates could of course be made of any size or shape to fit various designs of cars such as box cars, flat cars and the like.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

A device of the character described comprising an inner and outer crate each provided with a door adapted to register with each other, springs interposed between said crates at the top, bottom, sides and ends, springs disposed across the corners of the inner crate at the top and bottom thereof, one side of said springs being secured to said inner crate, rods on the other sides of said springs, said rods being movably projected through the corners of said outer crate, as described.

In testimony whereof I affix my signature in presence of two witnesses.

IRVING HILL.

Witnesses:
STEPHEN M. BLEWETT,
CLARENCE M. SMITH.

Copies of this patent may be obtained for five cents each, by addressing the "Commissioner of Patents, Washington, D. C."